UNITED STATES PATENT OFFICE.

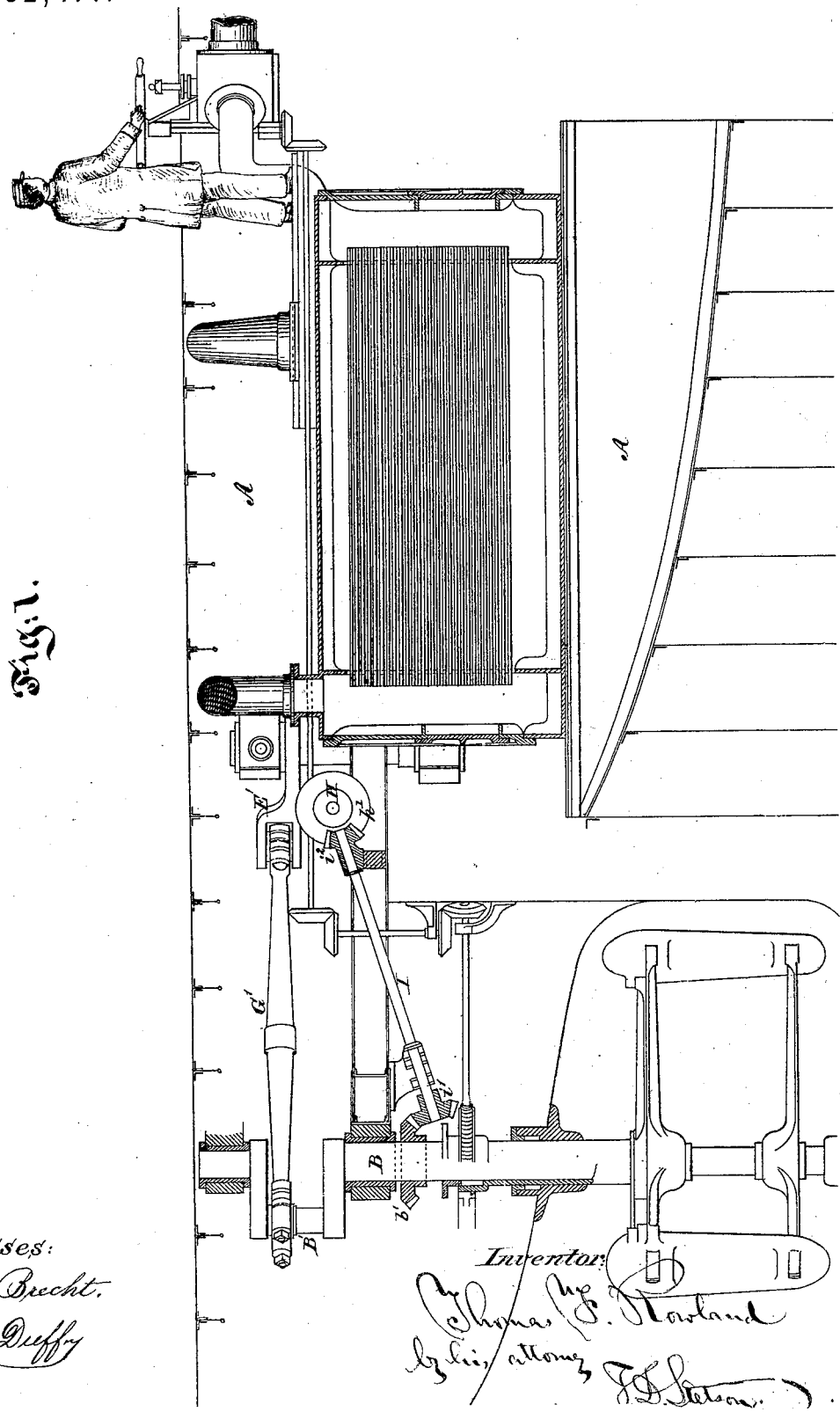

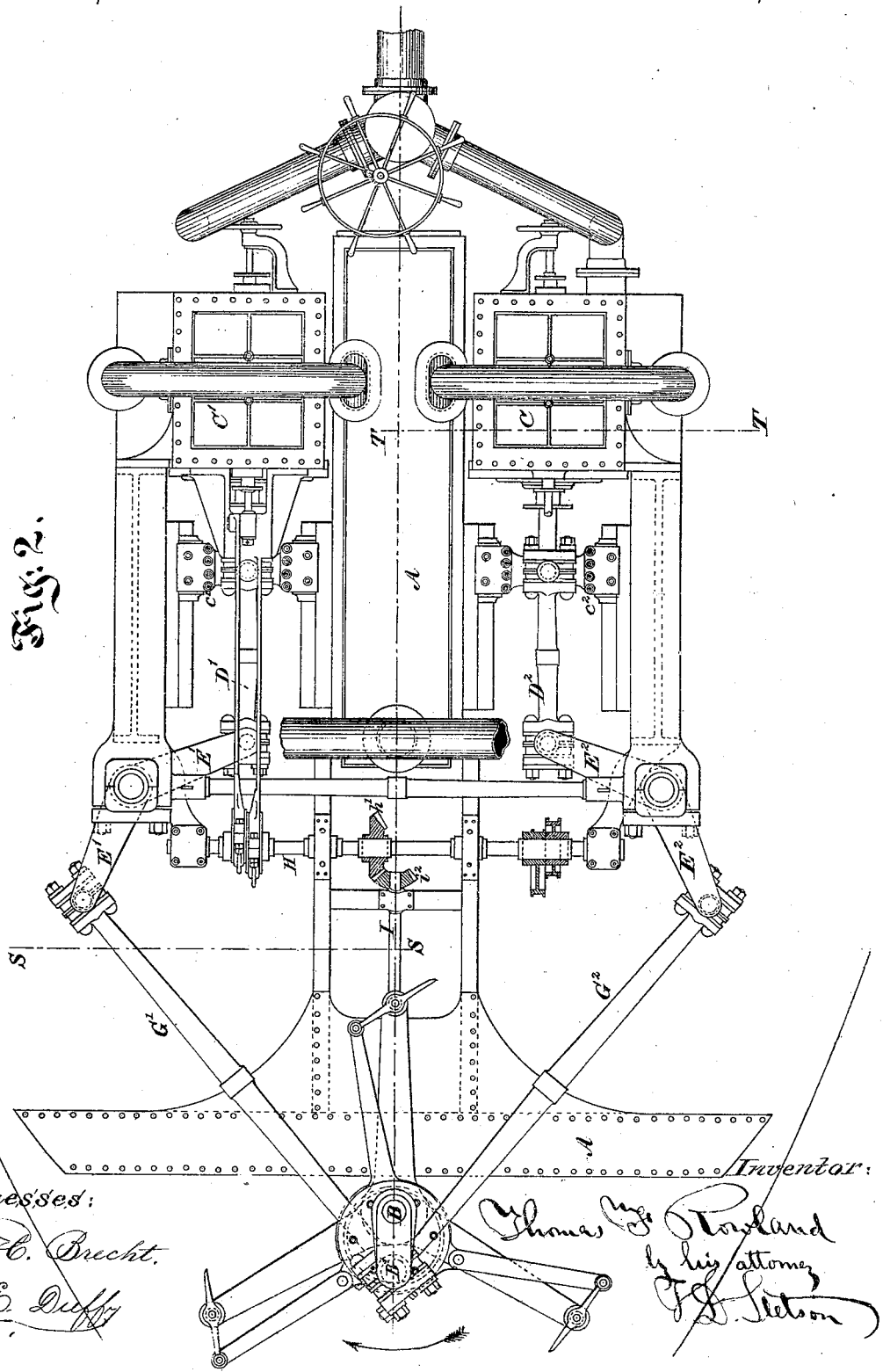

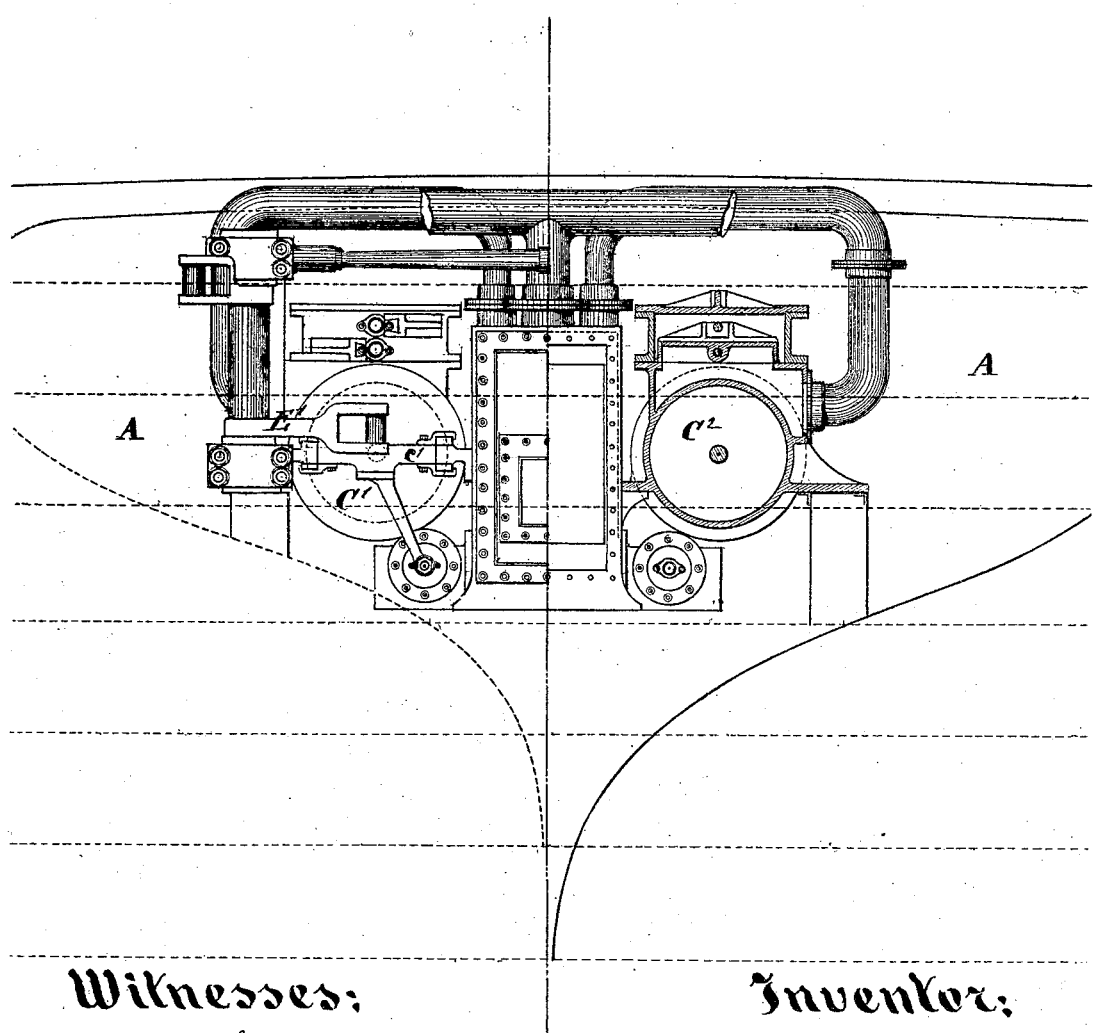

THOMAS F. ROWLAND, OF GREEN POINT, (BROOKLYN,) NEW YORK.

IMPROVEMENT IN STEAM-ENGINES.

Specification forming part of Letters Patent No. 132,414, dated October 22, 1872.

*To all whom it may concern:*

Be it known that I, THOMAS F. ROWLAND, of Green Point, Brooklyn, in Kings county, in the State of New York, have invented certain Improvements in Steam - Vessels, applicable also to vessels driven by gas or analogous engines, of which the following is a specification:

Steam-vessels have been propelled by wheels provided with feathering-paddles, and mounted on upright shafts. There are advantages resulting from the use of such wheels which make them highly desirable, especially for certain classes of vessels; but there is a difficulty in properly connecting engines to such mechanism. This invention is intended to overcome those difficulties. I mount two level cylinders near each other, and with their axes parallel, to serve as the steam-cylinders, providing each with the proper appurtenances for the admission and exhausting of the steam. The piston-rods, cross-heads, slides, &c., are arranged in the ordinary manner, leading backward toward the propeller-shaft, and the power is communicated through links to levers mounted nearer the sides of the ship. Each engine connects to the inner arm of a lever, and the outer arm is connected by a connecting-rod to a crank on the upright shaft. It results that the engines, although parallel and close together, work, in effect, at right angles, or nearly so, on the crank, and the power is transmitted very advantageously.

To operate the valves, I mount suitable eccentrics in the ordinary manner on a single horizontal shaft, which extends crosswise of the vessel or a little forward of the upright main shaft, and is connected thereto by simple gearing, so that it revolves coincident therewith.

The following is a description of what I consider the best means of carrying out the invention. The accompanying drawing forms a part of this specification.

Figure 1 is a central longitudinal section through the after part of the vessel. It shows the propeller-wheel and some of its accessories with one of the levers and the connecting-rod from it to the crank. The section is taken through the condenser, which may be of any ordinary or suitable construction, and does not show either of the cylinders. Fig. 2 is a plan view, showing the entire mechanism with certain pipes broken away. Each piston is represented as standing at about half stroke. Fig. 3 is a cross-section. The left side from the center-line is a cross-section on the line S S in Fig. 2, and the right side is a section on the line T T in the same figure.

Similar letters of reference indicate like parts in all the figures.

A is the fixed work, including the hull of the ship, the engine-framing, condenser, &c. B is the main shaft, and $B^1$ the crank forged therein, as will be obvious. The drawing represents some of the details of the mechanism, which controls the position of the feathering - paddles; but these form no part of my invention, and need not be specially described. $C^1$ $C^2$ are steam-cylinders operating through cross-heads $c^1$ $c^2$ and connecting-links $D^1$ $D^2$ to give motion to the levers $E^1$ $E^2$. The construction of these levers will be readily understood from the figures. There is a stout upright shaft which serves as a fulcrum or center of each, and the arm extending inward to receive the power from the corresponding engine is at a lower level than the arm extending outward to communicate the power to the crank. $G^1$ $G^2$ are the connecting-rods leading from suitable pins in the outer arms of the respective levers $E^1$ $E^2$ to a single crank, $B'$, on the main shaft B. Fig. 2 shows the angle at which these connections operate when the engines are at about half stroke. H is a counter-shaft or secondary shaft, which performs the important functions of operating the valves for the respective cylinders by means of eccentrics mounted thereon, as represented. Motion is communicated to this counter-shaft H by means of a connecting-shaft, I, which has a bevel-gear wheel at each end. The bevel-gear wheel $i^1$ at the after end receives motion from the bevel-gear wheel $b'$ on the main shaft, and the bevel-wheel $i^2$ on the front end communicates the motion thus received to the bevel-gear wheel $h'$ on the shaft H. This mechanism operates either forward or backward. I cut the gears so as to involve little back-lash or lost motion between the shafts B and H, or to make a proper allowance for the lost motion on backing, &c., in the mounting of the eccentrics and their connections. I can use any kind of link motion or other desired cut-off.

This arrangement of mechanism may be used with some advantage in communicating power to upright shafts in grist-mills or other stationary work. It is, however, more especially beneficial on ship-board, where it is more important to keep the cylinders close together.

The construction of the levers $E^1$ $E^2$, and their arrangement relatively to the cylinders and crank, allows the cylinders to stand at a much lower level than the crank. It is desirable to keep the cylinders, and, in fact, as much as possible of the steam apparatus, below the water-line—in short, at as low a level as possible—while the form of the ship and the necessity for the employment of some gearing below the crank and the upright shaft makes it desirable to mount the crank B' at as high a level as possible. This is provided for by the levers $E^1$ $E^2$ being formed with stout upright shafts, with the inward arm at a low level to receive the power, and the arm which extends outward at a much higher level to deliver the power through the connecting-rod.

I claim as my invention—

1. The levers $E^1$ $E^2$ and connections $G^1$ $G^2$, $D^1$ $D^2$, arranged relatively to the upright shaft B B' and the cylinders $C^1$ $C^2$ and their adjuncts, as and for the purposes herein set forth.

2. In combination with the parallel cylinders $C^1$ $C^2$ and the mechanism connecting the same to the shaft B, I claim the shaft H, carrying bevel-gearing and receiving motion from the main shaft B through the connecting-shaft I, as and for the purposes specified.

In testimony whereof I have hereunto set my hand this 26th day of August, 1872, in the presence of two subscribing witnesses.

THOS. F. ROWLAND.

Witnesses:
   THOMAS D. STETSON,
   WARREN E. HILL.